(12) United States Patent
Kawazu et al.

(10) Patent No.: US 8,429,895 B2
(45) Date of Patent: Apr. 30, 2013

(54) INTERNAL COMBUSTION ENGINE

(75) Inventors: Takanori Kawazu, Toyota (JP); Toshihiro Kawai, Toyota (JP); Kiyoshi Naiki, Obu (JP); Takashi Tsukiyama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 183 days.

(21) Appl. No.: 12/745,922

(22) PCT Filed: Nov. 26, 2008

(86) PCT No.: PCT/IB2008/003234
§ 371 (c)(1),
(2), (4) Date: Jun. 3, 2010

(87) PCT Pub. No.: WO2009/071972
PCT Pub. Date: Jun. 11, 2009

(65) Prior Publication Data
US 2010/0242452 A1    Sep. 30, 2010

(30) Foreign Application Priority Data

Dec. 4, 2007   (JP) .................................. 2007-313640

(51) Int. Cl.
*F02M 25/06* (2006.01)
*F01N 3/00* (2006.01)
*F01N 3/02* (2006.01)
*F01N 3/10* (2006.01)

(52) U.S. Cl.
USPC .................... 60/278; 60/298; 60/299; 60/320

(58) Field of Classification Search ..................... 60/278, 60/298, 299, 320
See application file for complete search history.

(56) References Cited

U.S. PATENT DOCUMENTS 7,032,577 B2 *   4/2006   Rosin et al. .............. 123/568.12

FOREIGN PATENT DOCUMENTS

| DE | 196 06 202 A1 | 8/1997 |
|---|---|---|
| DE | 101 43 091 A1 | 3/2003 |
| EP | 1 830 046 A2 | 9/2007 |
| GB | 2 271 412 A | 4/1994 |
| JP | 49-071616 U | 10/1972 |
| JP | 11-125151 A | 5/1999 |
| JP | 2000-045884 A | 2/2000 |
| JP | 2004-068608 A | 3/2004 |
| JP | 2005-016477 A | 1/2005 |
| JP | 2005-054662 * | 3/2005 |
| JP | 2005-155448 A | 6/2005 |
| JP | 2007-092718 A | 4/2007 |
| JP | 2007-303381 A | 11/2007 |
| WO | 2004/033859 A1 | 4/2004 |
| WO | 2004/046516 A1 | 6/2004 |
| WO | 2007/081342 A1 | 7/2007 |

OTHER PUBLICATIONS

Machine Translation JP 2005-054662.*

* cited by examiner

*Primary Examiner* — Thomas Denion
*Assistant Examiner* — Dapinder Singh
(74) *Attorney, Agent, or Firm* — Sughrue Mion, PLLC

(57) ABSTRACT

An internal combustion engine includes: an exhaust heat collector, in which exhaust gas exchanges heat with engine coolant, that heats the engine coolant; an EGR mechanism that recirculates a part of the exhaust gas to an intake passage through an EGR passage that branches from an exhaust passage; and an EGR cooler that cools the exhaust gas flowing through the EGR passage through heat exchange with the engine coolant supplied from the exhaust heat collector.

7 Claims, 6 Drawing Sheets

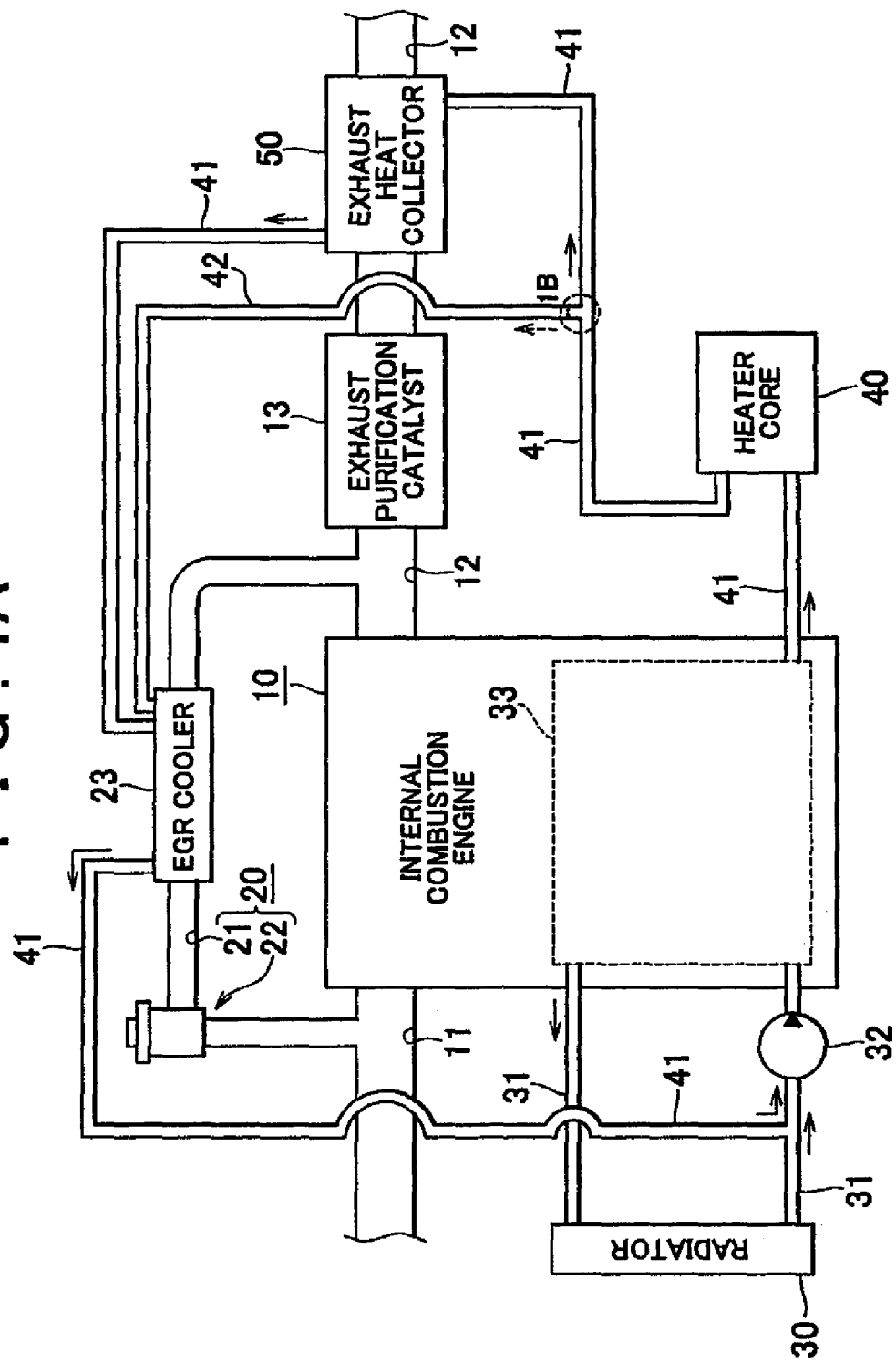

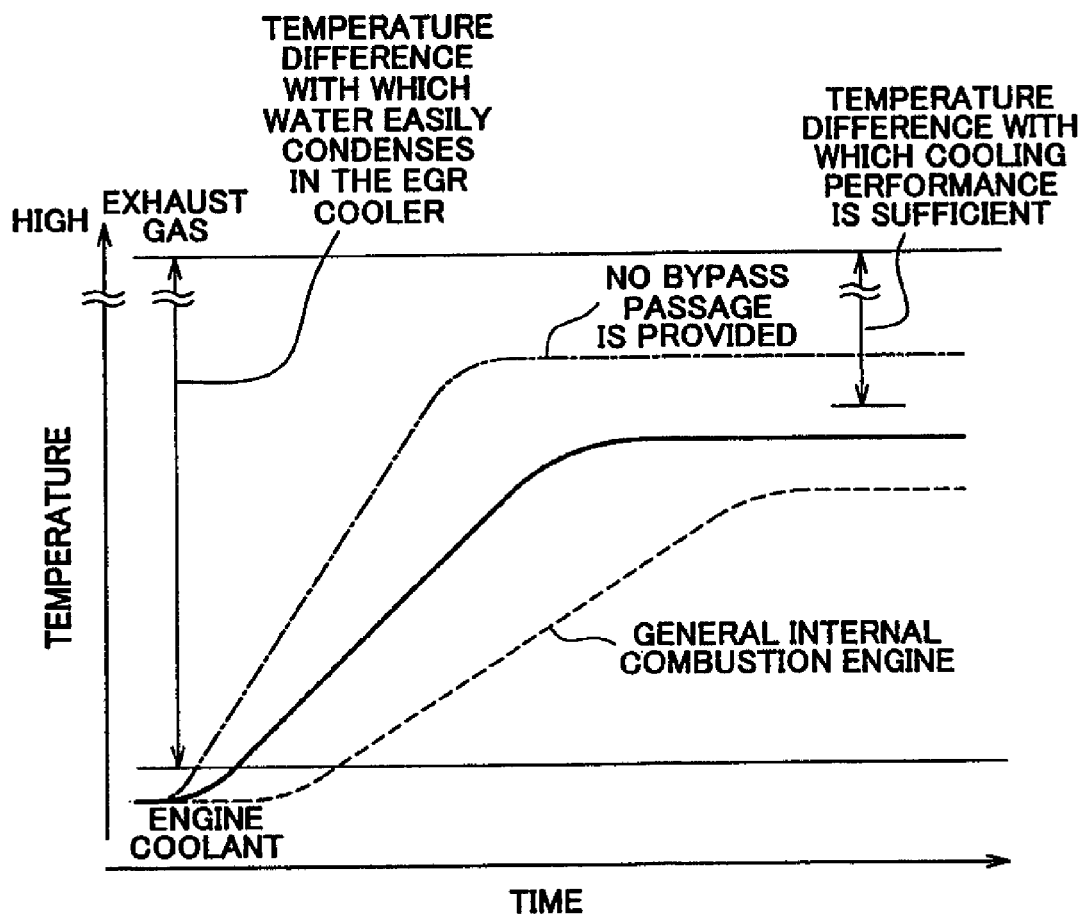

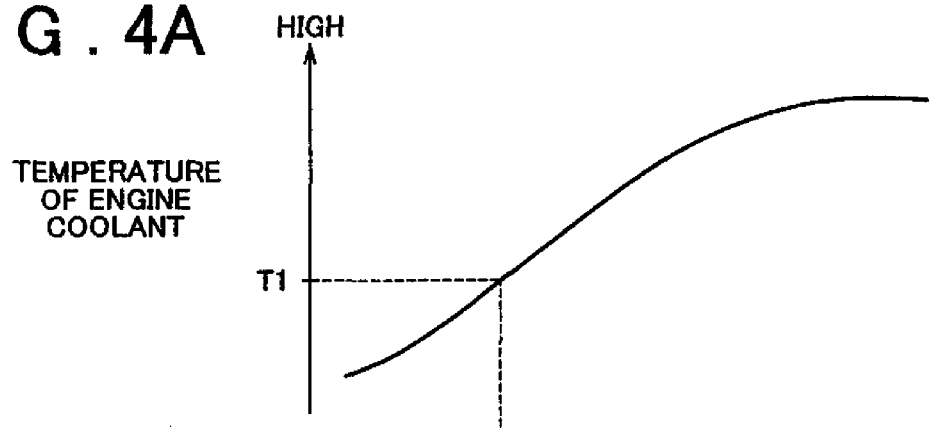
FIG.4A — TEMPERATURE OF ENGINE COOLANT
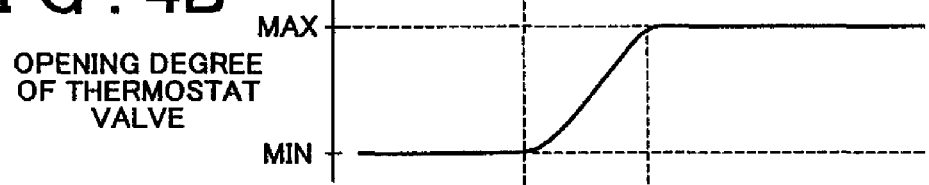
FIG.4B — OPENING DEGREE OF THERMOSTAT VALVE
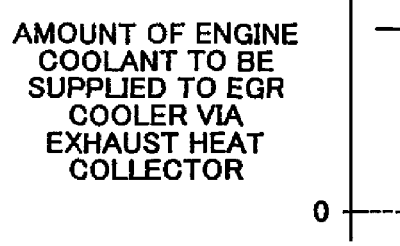
FIG.4C — AMOUNT OF ENGINE COOLANT TO BE SUPPLIED TO EGR COOLER VIA EXHAUST HEAT COLLECTOR
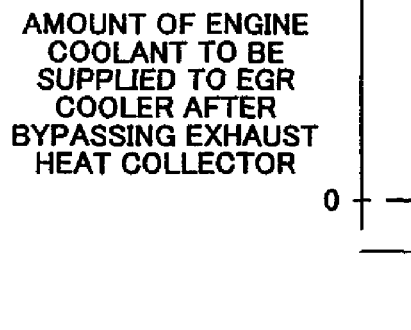
FIG.4D — AMOUNT OF ENGINE COOLANT TO BE SUPPLIED TO EGR COOLER AFTER BYPASSING EXHAUST HEAT COLLECTOR
TIME

INTERNAL COMBUSTION ENGINE

BACKGROUND OF THE INVENTION

1. Field of the Invention

The present invention relates to an internal combustion engine including an exhaust gas recirculation (EGR) cooler that exchanges heat between exhaust gas that is recirculated to a combustion chamber through an EGR mechanism and engine coolant for cooling the recirculated exhaust gas.

2. Description of the Related Art

Some internal combustion engines including an EGR mechanism that recirculates a portion of exhaust gas to a combustion chamber to reduce nitrogen oxides (NOx) contained in the exhaust gas are known to include an EGR cooler that cools the exhaust gas to be recirculated via the EGR mechanism through heat exchange with engine coolant (for example, see Japanese Patent Application Publication No. 2000-45884 (JP-A-2000-45884)).

As shown in FIG. 5, such an EGR cooler is provided in an intermediate part of an EGR passage 2, which branches from an exhaust passage of the internal combustion engine and is connected to an intake passage. A liquid chamber 3 is provided as a coolant passage inside the EGR cooler. To the liquid chamber 3 is connected a flow-in passage 4, which is connected to a coolant passage of the internal combustion engine to allow the engine coolant to flow into the liquid chamber 3 therethrough as indicated by an arrow in FIG. 5. The engine coolant having flowed into the liquid chamber 3 is returned to the coolant passage of the internal combustion engine through a flow-out passage 5 as indicated by an arrow in FIG. 5. Also as shown in FIG. 5, a plurality of exhaust cooling passages 6 are provided in the EGR cooler that pass in the liquid chamber 3 to connect an EGR passage 2A on the exhaust passage side and an EGR passage 2B on the intake passage side.

This allows the exhaust gas, having flowed into the EGR cooler through the EGR passage 2A on the exhaust passage side, to flow into the EGR passage 2B on the intake passage side through the exhaust cooling passages 6, which extend in the liquid chamber 3 in which the engine coolant flows. Consequently, heat is exchanged between the engine coolant flowing in the liquid chamber 3 and the exhaust gas flowing through the exhaust cooling passages 6.

As described above, inside the EGR cooler in which a coolant passage through which engine coolant flows and a passage for exhaust gas are provided adjacently, heat is exchanged between the engine coolant and the exhaust gas via a partition wall between the respective adjacent passages. Consequently, the exhaust gas is cooled before being recirculated to improve the charge efficiency of the exhaust gas into the combustion chamber, and the temperature of combustion in the combustion chamber is reduced to more efficiently suppress the generation of NOx.

In recent years, however, it has been desired to recirculate the exhaust gas to the combustion chamber even during cold engine operation, in order to further improve the exhaust properties, or to comply with stricter emission regulations, or for other reasons. However, because the temperature of the engine coolant is extremely low during cold engine operation, the difference in temperature between the exhaust gas and the engine coolant flowing through the EGR cooler is significantly large. As a result, the recirculated exhaust gas is abruptly cooled in the EGR cooler during cold engine operation, which may cause water contained in the exhaust gas to condense in the EGR cooler to result in the generation of a large amount of condensed water in the EGR cooler.

Once water has condensed in this way, the EGR cooler may become corroded and the condensed water may enter the intake passage side and be recirculated along with the exhaust gas. This may result in various inconveniences, freezing of the condensed water when the engine is stopped to thereby block the induction port of the intake passage for the exhaust gas, or like that intake valves become stuck.

SUMMARY OF THE INVENTION

The present invention provides an internal combustion engine that can suppress the generation of condensed water in an EGR cooler even during cold engine operation.

A first aspect of the present invention provides an internal combustion engine including: an exhaust heat collector, in which exhaust gas exchanges heat with engine coolant, that heats the engine coolant; an EGR mechanism that recirculates a portion of the exhaust gas to an intake passage through an EGR passage that branches from an exhaust passage; and an EGR cooler that cools the exhaust gas flowing through the EGR passage through heat exchange with the engine coolant supplied from the exhaust heat collector.

According to the above configuration, the EGR cooler is supplied with the engine coolant heated through heat exchange in the exhaust heat collector. Therefore, the difference in temperature between the engine coolant to be supplied to the EGR cooler and the exhaust gas is small even during cold engine operation, so that the generation of condensed water in the EGR cooler can be suppressed. In addition, the exhaust heat collector can heat the engine coolant utilizing the heat of the exhaust gas, and therefore can heat the engine coolant to be supplied to the EGR cooler without consuming additional energy such as electricity.

The internal combustion engine according to the above aspect may further include: a first coolant passage that passes through the internal combustion engine; and a second coolant passage, branched from the first coolant passage, that supplies the engine coolant to the EGR cooler through the exhaust heat collector.

In the internal combustion engine according to the above aspect, the exhaust heat collector may be provided downstream of an exhaust purification catalyst provided downstream of a point in the exhaust passage at which the EGR passage branches from the exhaust passage.

According to the above configuration, the exhaust gas that has passed through the exhaust purification catalyst and thus has lowered in temperature is inducted into the exhaust heat collector, so that the difference in temperature between the engine coolant and the exhaust gas in the exhaust heat collector is small. Therefore, the generation of condensed water can be suppressed not only in the EGR cooler but also in the exhaust heat collector, and thus the generation of corrosion can be suppressed in the EGR cooler and the exhaust heat collector.

The internal combustion engine according to the above aspect may further include a bypass passage that bypasses the exhaust heat collector to supply the engine coolant to the EGR cooler.

The internal combustion engine according to the above aspect may further include an amount adjustment device that adjusts the amount of the engine coolant that is supplied to the EGR cooler through the second coolant passage and the amount of the engine coolant supplied to the EGR cooler through the bypass passage.

The amount adjustment device may be a throttle that reduces the cross sectional area of at least one of the second coolant passage and the bypass passage to restrict the flow of the engine coolant through at least one of the second coolant passage and the bypass passage.

Supplying the EGR cooler with the engine coolant heated through heat exchange in the exhaust heat collector as in the above aspect can suppress the generation of condensed water during cold engine operation. When warm-up has been completed and the temperature of the engine coolant has increased, however, supplying the EGR cooler with the engine coolant heated in the exhaust heat collector would unfavorably impair the cooling effect of the EGR cooler for the exhaust gas. Thus, the above aspect of the invention is provided with a bypass passage that bypasses the exhaust heat collector to supply the engine coolant to the EGR cooler. This allows a portion of the engine coolant to be supplied to the EGR cooler through the bypass passage, thereby supplying the EGR cooler with a mixture of the engine coolant heated in the exhaust heat collector and the engine coolant supplied after bypassing the exhaust heat collector through the bypass passage. As a result, the temperature of the engine coolant that is supplied to the EGR cooler may be adjusted so as to suppress the condensation of water during cold engine operation and suppress the lowering of the cooling effect of the EGR cooler for the exhaust gas after the completion of warm-up.

In order to achieve both the suppression effect for the generation of condensed water during cold engine operation and the cooling performance of the EGR cooler after the completion of warm-up, it is desirable to adjust the amount of the engine coolant that is supplied to the EGR cooler through the exhaust heat collector and the amount of the engine coolant that is supplied to the EGR cooler through the bypass passage based on the respective characteristics of the internal combustion engine, the exhaust heat collector, and the EGR cooler. For this purpose, the above aspect of the invention is provided with amount adjustment device that adjusts the amount of the engine coolant supplied to the EGR cooler via the exhaust heat collector and the amount of the engine coolant to be supplied to the EGR cooler through the bypass passage. By providing such amount adjustment device, it is possible to appropriately suppress the condensation of water and modulate the cooling performance of the EGR cooler.

Specific examples of such an amount adjustment device may include a throttle that reduces the cross sectional area of at least one of the second coolant passage and the bypass passage to restrict the passage of the engine coolant through at least one of the second coolant passage and the bypass passage. As an alternative to providing the throttle described above, the amount adjustment device may be implemented by a structure that makes the respective cross sectional areas of the passage that supplies the engine coolant to the exhaust heat collector and the bypass passage different from each other.

The amount adjustment device may be a thermostat valve that opens and closes the bypass passage based on the temperature of the engine coolant. The thermostat valve may block the bypass passage and supply the EGR cooler with the engine coolant heated by the exhaust heat collector if the temperature of the engine coolant is below a predetermined temperature, and open the bypass passage and supply the EGR cooler with the engine coolant through the bypass passage if the temperature of the engine coolant is equal to or above the predetermined temperature.

According to the above configuration, if the temperature of the engine coolant is below the predetermined temperature and water may condense, the thermostat valve blocks the bypass passage and supplies the EGR cooler with the engine coolant heated by the exhaust heat collector. On the other hand, if warm-up of the internal combustion engine has been completed and the temperature of the engine coolant is equal to or above the predetermined temperature, the thermostat valve opens the bypass passage and supplies the EGR cooler with engine coolant that has bypassed the exhaust heat collector. This makes it possible to supply the engine coolant at a temperature appropriately adjusted according to the possibility that water will condense in the EGR cooler, thereby minimizing the lowering of the cooling effect of the EGR cooler for the exhaust gas and suitably suppressing the generation of condensed water in the EGR cooler during cold engine operation.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1A is a schematic diagram of the configuration of an engine coolant passage of an internal combustion engine in accordance with a first embodiment of the present invention;

FIG. 2 is a time chart that shows changes in the difference in temperature between exhaust gas and engine coolant in the internal combustion engine in accordance with the first embodiment;

FIG. 4A is a time chart that shows the relationship between the duration of operation and the temperature of engine coolant in the internal combustion engine in accordance with the second embodiment;

FIG. 4B is a time chart that shows the relationship between the duration of operation and the opening degree of the thermostat valve in the internal combustion engine in accordance with the second embodiment;

FIG. 4C is a time chart that shows the relationship between the duration of operation and the amount of engine coolant that passes via the exhaust heat collector in the internal combustion engine in accordance with the second embodiment;

FIG. 4D is a time chart that shows the relationship between the duration of operation and the amount of engine coolant that bypasses the exhaust heat collector in the internal combustion engine in accordance with the second embodiment.

DETAILED DESCRIPTION OF THE PREFERRED EMBODIMENTS

Figure 1B:
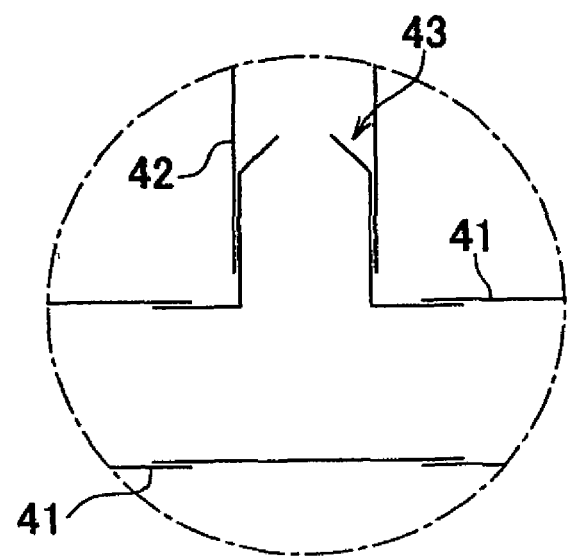
FIG. 1B is an enlarged view of a part of FIG. 1A.

Hereinafter, a first embodiment of an internal combustion engine in accordance with the present invention will be described with reference to FIGS. 1 and 2. FIGS. 1A and 1B are each a schematic diagram that shows the general configuration of a coolant passage of the internal combustion engine in accordance with this embodiment. Specifically, FIG. 1B is an enlarged view of a part of FIG. 1A surrounded by a dash-and-dot line.

As shown in the upper part of FIG. 1A, an internal combustion engine 10 of this embodiment is provided with an EGR mechanism 20 that recirculates exhaust gas to a combustion chamber. As shown in FIG. 1A, an EGR passage 21, which recirculates the exhaust gas to an intake passage 11 of the internal combustion engine 10, is connected to a point in an exhaust passage 12 upstream of an exhaust purification catalyst 13.

Also as shown in FIG. 1A, the EGR passage 21 is provided with an EGR valve 22 that adjusts the amount of the exhaust gas that is recirculated, and an EGR cooler 23 that is disposed upstream of the EGR valve 22 and exchanges heat between the exhaust gas and engine coolant to cool the recirculated exhaust gas.

Inside the EGR cooler 23, a coolant passage through which the engine coolant flows and a passage for the recirculated exhaust gas are provided adjacently, so that heat is exchanged between the engine coolant and the exhaust gas via a partition wall between the respective adjacent passages. As a result of the heat exchange, the recirculated exhaust gas is cooled to improve the charging efficiency of the exhaust gas into the combustion chamber, and the temperature of combustion in the combustion chamber is reduced to further improve the suppression effect of the EGR mechanism 20 for NOx.

As shown in the lower left of FIG. 1A, a primary coolant passage 31 including a radiator 30 is connected to the internal combustion engine 10. A water pump 32 is provided in the primary coolant passage 31. When the water pump 32 is driven during engine operation, the engine coolant is circulated between a water jacket 33 formed in the internal combustion engine 10 and the radiator 30. That is, the engine coolant, which has absorbed heat from cylinders and other various parts of the internal combustion engine 10 and thus has increased in temperature, is inducted into the radiator 30 through the primary coolant passage 31. After being cooled by the radiator 30, the engine coolant is pressure-fed by the water pump 32 to be inducted into the water jacket 33 again.

The vehicle in accordance with this embodiment includes a heating device that heats the air in the passenger compartment through heat exchange with the engine coolant. As shown in the lower right of FIG. 1A, a secondary coolant passage 41 that supplies the engine coolant to a heater core 40 of the heating device is connected to the water jacket 33, so that the engine coolant heated by the combustion heat of the internal combustion engine 10 is inducted into the heater core 40 through the secondary coolant passage 41. Then, heat is exchanged in the heater core 40 between the engine coolant supplied through the secondary coolant passage 41 and air, and the heated air is utilized to heat the air in the passenger compartment.

As shown in the right side of FIG. 1A, a point in the secondary coolant passage 41, downstream of the heater core 40, is connected to an exhaust heat collector 50, which is provided in a portion of the exhaust passage 12 downstream of the exhaust purification catalyst 13. This allows the engine coolant that has been subjected to heat exchange with air in the heater core 40 to be inducted into the exhaust heat collector 50 through the secondary coolant passage 41.

The exhaust heat collector 50 exchanges heat between the exhaust gas and the engine coolant. Inside the exhaust heat collector 50, as with the EGR cooler 23, a coolant passage through which the engine coolant flows and a passage for the exhaust gas are provided adjacently, so that heat is exchanged between the engine coolant and the exhaust gas via a partition wall between the respective adjacent passages.

The engine coolant inducted into the exhaust heat collector 50 is increased in temperature through heat exchange with the exhaust gas passing through the exhaust purification catalyst 13 to be inducted into the exhaust heat collector 50. Because the exhaust heat collector 50 utilizes the heat of the exhaust gas to heat the engine coolant in this way, warm-up can be completed quickly even during cold engine operation.

A portion of the secondary coolant passage 41 downstream of the exhaust heat collector 50 is connected to the EGR cooler 23. This allows the engine coolant heated through heat exchange with the exhaust gas in the exhaust heat collector 50 to be inducted into the EGR cooler 23. Then, heat is exchanged in the EGR cooler 23 between the recirculated exhaust gas and the engine coolant to cool the recirculated exhaust gas as discussed above.

As shown in the lower left of FIG. 1A, a portion of the secondary coolant passage 41 downstream of the EGR cooler 23 is connected to a portion of the primary coolant passage 31 upstream of the water pump 32. This allows the engine coolant that has been subjected to heat exchange in the EGR cooler 23 as discussed above to merge with the engine coolant flowing through the primary coolant passage 31, and the merged engine coolant is pressure-fed by the water pump 32 to be inducted into the water jacket 33 again.

As shown in the right side of FIG. 1A, a bypass passage 42 is connected to a portion of the secondary coolant passage 41 between the heater core 40 and the exhaust heat collector 50, so that a portion of the engine coolant supplied from the heater core 40 bypasses the exhaust heat collector 50 and is supplied to the EGR cooler 23.

A throttle 43 is provided at the connection between the secondary coolant passage 41 and the bypass passage 42 as an amount adjustment device for adjusting the amount of the engine coolant flowing through the passages 41 and 42, respectively. As shown as enlarged in FIG. 1B, the throttle 43 restricts the flow of the engine coolant through the bypass passage 42 by reducing the cross sectional area of the bypass passage 42 to increase the amount of the engine coolant supplied to the EGR cooler 23 via the exhaust heat collector 50 relative to the amount of the engine coolant supplied to the EGR cooler 23 through the bypass passage 42. Consequently, a portion of the engine coolant that is inducted into the EGR cooler 23 flows through the bypass passage 42 to bypass the exhaust heat collector 50, while the majority of the engine coolant is supplied to the EGR cooler 23 via the exhaust heat collector 50, as the engine coolant circulates.

Hereinafter, changes in the difference in temperature between the exhaust gas and the engine coolant in the internal combustion engine 10 in accordance with this embodiment will be described with reference to FIG. 2. As shown in the left side of FIG. 2, the temperature of the engine coolant is extremely low at cold engine start. Therefore, the difference in temperature between the exhaust gas and the engine coolant flowing through the EGR cooler 23 is significantly large, and larger than such a level that water easily condenses due to liquefaction of water contained in the exhaust gas.

In this embodiment, the engine coolant that has passed via the exhaust heat collector 50 and thus has been heated is supplied to the EGR cooler 23 as discussed above. Therefore, the temperature of the engine coolant quickly increases as indicated by the solid line in FIG. 2, compared to the case of a conventional internal combustion engine indicated by the broken line. Consequently, the difference in temperature between the engine coolant and the exhaust gas to be supplied to the EGR cooler 23 quickly falls below the level at which water easily condenses, as shown in FIG. 2, thereby suppressing the generation of condensed water.

In addition, the internal combustion engine 10 of this embodiment is provided with the bypass passage 42 as discussed above, so that a portion of the engine coolant that is supplied to the EGR cooler 23 bypasses the exhaust heat collector 50. Therefore, the temperature of the engine coolant supplied to the EGR cooler 23, when warm-up of the internal combustion engine 10 has been completed and the temperature of the engine coolant has increased, is lower than in the case where no bypass passage 42 were provided and all the engine coolant supplied to the EGR cooler 23 flows via the exhaust heat collector 50 as indicated by the dash-and-dot line in FIG. 2.

Consequently, after the completion of warm-up, the difference in temperature between the exhaust gas and the engine coolant that is supplied to the EGR cooler 23 is larger than such a level that the cooling effect of the EGR cooler 23 is sufficient as shown in FIG. 2, thereby securing the cooling effect of the EGR cooler 23 even after the completion of warm-up.

According to the first embodiment, the following effects are obtained. (1) The EGR cooler 23 is supplied with engine coolant that has been heated through heat exchange in the exhaust heat collector 50. Therefore, the difference in temperature between the engine coolant supplied to the EGR cooler 23 and the exhaust gas is small, even during cold engine operation, so that the condensation of water in the EGR cooler 23 is suppressed. In addition, the exhaust heat collector 50 heats the engine coolant utilizing the heat of the exhaust gas, and therefore heats the engine coolant supplied to the EGR cooler 23 without consuming additional energy such as electricity.

(2) The exhaust heat collector 50 is provided in a portion of the exhaust passage 12 downstream of the exhaust purification catalyst 13. Therefore, the temperature of exhaust gas passing through the exhaust purification catalyst 13 is reduced before being inducted into the exhaust heat collector 50, so that the difference in temperature between the engine coolant and the exhaust gas in the exhaust heat collector 50 is small. Therefore, the generation of condensed water may be suppressed in not only the EGR cooler 23 but also the exhaust heat collector 50, and thus corrosion in the EGR cooler 23 and the exhaust heat collector 50 is suppressed.

(3) Supplying the EGR cooler 23 with the engine coolant heated in the exhaust heat collector 50 suppress the condensation of water during cold engine operation. When warm-up has been completed and the temperature of the engine coolant has increased, however, supplying the EGR cooler 23 with the engine coolant heated in the exhaust heat collector 50 would unfavorably impair the cooling effect of the EGR cooler 23 on the exhaust gas. In this respect, the internal combustion engine 10 according to this embodiment is provided with the bypass passage 42 that bypasses the exhaust heat collector 50 to supply the engine coolant to the EGR cooler 23. This allows a portion of the engine coolant to be supplied to the EGR cooler 23 through the bypass passage 42, thereby supplying the EGR cooler 23 with a mixture of the engine coolant heated in the exhaust heat collector 50 and the engine coolant that has bypassed the exhaust heat collector 50 through the bypass passage 42. As a result, the temperature of the engine coolant supplied to the EGR cooler 23 may be adjusted so to suppress the generation of condensed water during cold engine operation and suppress the reduction of the cooling effect of the EGR cooler 23 on the exhaust gas after the completion of warm-up.

(4) In addition, the throttle 43 is provided as an amount adjustment device that adjusts the amount of the engine coolant that is supplied to the EGR cooler 23 via the exhaust heat collector 50 and the amount of the engine coolant that is supplied to the EGR cooler 23 through the bypass passage 42. Therefore, it is possible to adjust the amount of the engine coolant supplied to the EGR cooler 23 through the exhaust heat collector 50 and the amount of the engine coolant supplied to the EGR cooler 23 through the bypass passage 42 in consideration of the respective characteristics of the internal combustion engine 10, the exhaust heat collector 50, and the EGR cooler 23. This makes it possible to suppress the condensation of water and modulate the cooling performance of the EGR cooler 23.

The first embodiment may be modified as described below. The first embodiment is provided with the throttle 43 functioning as an amount adjustment device for reducing the cross sectional area of the bypass passage 42 to restrict the amount of the engine coolant flowing through the bypass passage 42. Alternatively, a throttle may be provided in the portion of the secondary coolant passage 41 that extends from the branch point from the bypass passage 42 to the EGR cooler 23 via the exhaust heat collector 50 to increase the amount of the engine coolant flowing through the bypass passage 42 relative to the amount of the engine coolant flowing through the secondary coolant passage 41 Alternatively, the throttle may be omitted to allow an equal amount of the engine coolant to flow through both the passages. The selection of these characteristics will depend on the respective characteristics of the internal combustion engine 10, the exhaust heat collector 50, and the EGR cooler 23. That is, it is desirable to suitably modify the arrangement aspect of the throttle to adjust the amount of the engine coolant supplied to the EGR cooler 23 via the exhaust heat collector 50 and the amount of the engine coolant supplied to the EGR cooler 23 after bypassing the exhaust heat collector 50 according to the respective characteristics of the internal combustion engine 10, the exhaust heat collector 50, and the EGR cooler 23.

The above embodiment is provided with the throttle 43 functioning as an amount adjustment device. As an alternative to providing the throttle 43, the amount adjustment device may be implemented using a bypass passage 42 that has a cross-sectional area different from that of the secondary coolant passage 41.

Hereinafter, a second embodiment of the internal combustion engine in accordance with the present invention will be described with reference to FIGS. 3A and 3B and FIGS. 4A to 4D. The internal combustion engine in accordance with this embodiment is generally the same in configuration as that of the first embodiment, except that the throttle 43 is replaced with a thermostat valve 45. Therefore, the same components as those of the first embodiment are denoted by the same reference numerals and symbols to omit repeated descriptions and focus on the differences.

Figure 3A:
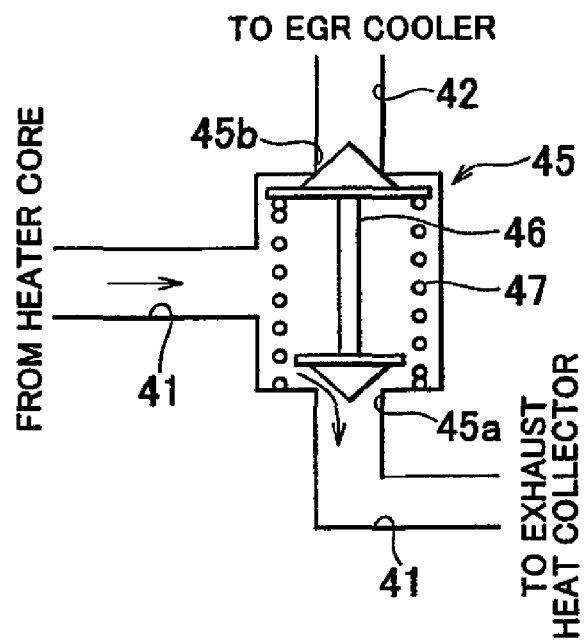
FIG. 3A is a schematic diagram that shows the configuration of a thermostat valve provided in a coolant passage of an internal combustion engine in accordance with a second embodiment when the flow-out port of a bypass passage is blocked.
Figure 3B:
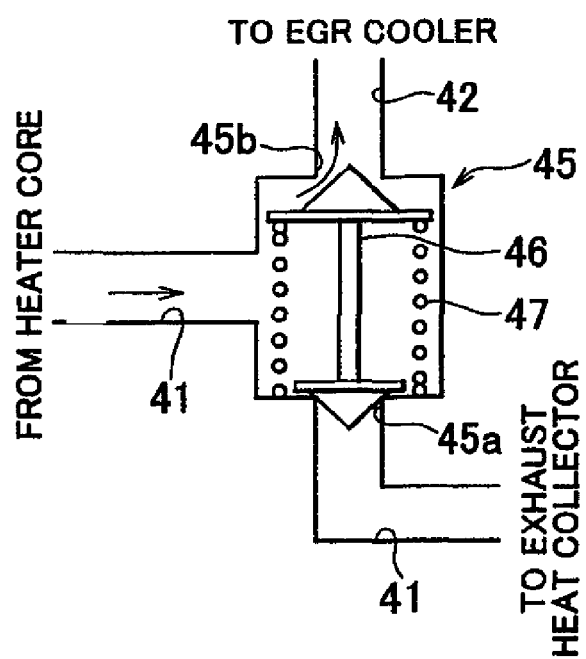
FIG. 3B is a schematic diagram that shows the configuration of the thermostat valve provided in the coolant passage of the internal combustion engine in accordance with the second embodiment when the flow-out port of a passage leading to an exhaust heat collector is blocked.
Figure 5:
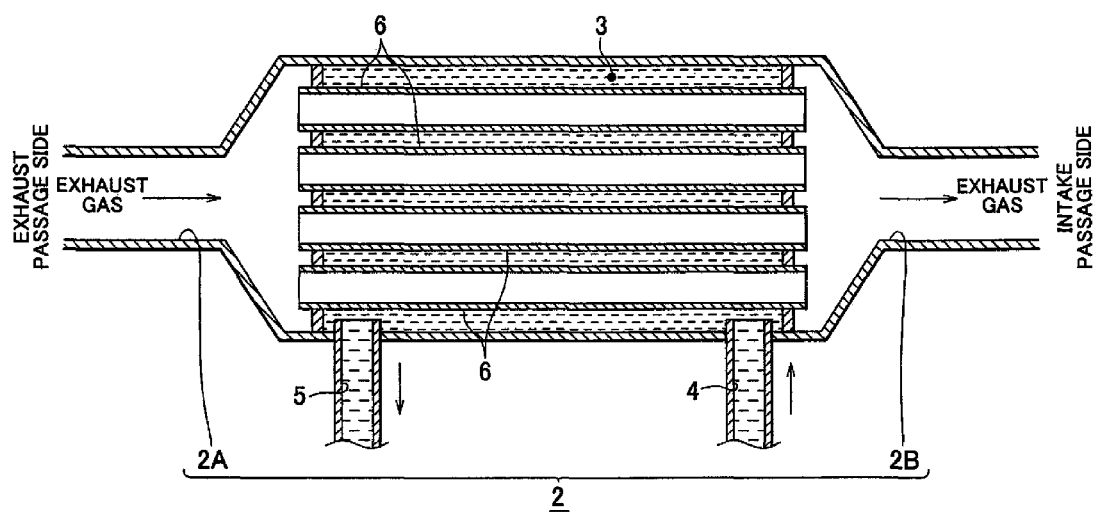
FIG. 5 is a cross sectional view that shows the configuration of a general EGR cooler.

FIGS. 3A and 3B are each schematic diagrams of the thermostat valve 45 in accordance with this embodiment. As shown in FIGS. 3A and 3B, the thermostat valve 45 includes a valve element 46 that selectively blocks either one of a flow-out port 45*a*, on the exhaust heat collector 50 side, connected to the secondary coolant passage 41 leading to the exhaust heat collector 50, and a flow-out port 45*b*, on the bypass passage 42 side, connected to the bypass passage 42. As shown in FIG. 3A, the valve element 46 is urged by a spring 47 and closed to block the flow-out port 45*b* on the bypass passage 42 side. The thermostat valve 45 has wax (not shown) sealed therein, and when the temperature of the engine coolant reaches a predetermined temperature T1, the wax liquefies and expands so that the valve element 46 is pushed against the urging force of the spring 47 and opened to thereby open the flow-out port 45*b* on the bypass passage 42 side as shown in FIG. 3B.

Hereinafter, the relationship between the temperature of the engine coolant that is supplied to the thermostat valve 45 and the opening degree of the thermostat valve 45 in the internal combustion engine 10 will be described in accordance with the second embodiment with reference to FIGS. 4A to 4D. FIGS. 4A to 4D are each time charts that show the relationship between the temperature of the engine coolant and the opening degree of the thermostat valve 45 in the internal combustion engine 10 in accordance with the second embodiment.

As shown in FIGS. 4A and 4B, when the temperature of the engine coolant is extremely low at cold engine start (before time t1), the thermostat valve 45 is closed to block the flow-out port 45*b* on the bypass passage 42 side. Therefore, as shown in FIGS. 4C and 4D, engine coolant that has bypassed the exhaust heat collector 50 is not supplied to the EGR cooler 23. Instead, all the engine coolant supplied from the heater core 40 side via the exhaust heat collector 50 is supplied to the EGR cooler 23. In this way, when the temperature of the engine coolant is extremely low and the difference in temperature between the exhaust gas and the engine coolant is so large that water easily condenses in the EGR cooler 23, the engine coolant heated by the exhaust heat collector 50 is supplied to the EGR cooler 23.

However, when the temperature of the engine coolant rises due to continuous engine operation to reach the predetermined temperature T1 (after time t1) as shown in FIG. 4A, the wax in the thermostat valve 45 is gradually liquefied and expanded to push the valve element 46 against the pressing force of the spring 47. Consequently, the opening degree of the thermostat valve 45 is gradually increased as shown in FIG. 4B, and the amount of the engine coolant to be supplied to the EGR cooler 23 that has bypassed the exhaust heat collector 50 gradually increases as shown in FIGS. 4C and 4D. In this way, if the temperature of the engine coolant rises and thereby reduces the difference in temperature between the exhaust gas and the engine coolant to such a degree that water barely condenses in the EGR cooler 23, the EGR cooler 23 is supplied with a mixture of the engine coolant heated by the exhaust heat collector 50 and the engine coolant flowing through the bypass passage 42. As a result, the temperature of the engine coolant that is supplied to the EGR cooler 23 decreases, which improves the cooling performance of the EGR cooler 23 for the exhaust air.

Then, when the thermostat valve 45 is opened to the maximum degree to open the flow-out port 45*b* on the bypass passage 42 side and block the flow-out port 45*a* on the exhaust heat collector 50 side (after time t2), no engine coolant is supplied to the EGR cooler 23 via the exhaust heat collector 50, thereby maximizing the cooling performance of the EGR cooler 23.

According to the second embodiment, the following effect can be obtained in addition to the effects (1) to (4) of the first embodiment. (1) The thermostat valve 45 is provided as an amount adjustment device that opens and closes the bypass passage 42 based on the temperature of the engine coolant. Therefore, if the temperature of the engine coolant is below the predetermined temperature T1 and water may condense in the EGR cooler 23, the thermostat valve 45 blocks the flow-out port 45*b* on the bypass passage 42 side to supply engine coolant heated by the exhaust heat collector 50 to the EGR cooler 23. On the other hand, when warm-up of the internal combustion engine 10 has been completed and the temperature of the engine coolant is equal to or above the predetermined temperature T1, the thermostat valve 45 opens the flow-out port 45*b* on the bypass passage 42 side to supply the EGR cooler 23 with engine coolant that has bypassed the exhaust heat collector 50. This makes it possible to supply the engine coolant at a temperature appropriately adjusted according to the possibility that water condenses in the EGR cooler 23, thereby minimizing the reduction of the cooling effect of the EGR cooler 23 for the exhaust gas and appropriately suppressing the generation of condensed water in the EGR cooler 23 during cold engine operation.

The second embodiment above may be modified suitably as described below. The second embodiment may be provided with the thermostat valve 45 that closes when the temperature of the engine coolant below than the predetermined temperature T1 to block the flow-out port 45*b* on the bypass passage 42 side and open the flow-out port 45*a* on the exhaust heat collector 50 side, and that opens when the temperature of the engine coolant is equal to or higher than the predetermined temperature T1 to open the flow-out port 45*b* on the bypass passage 42 side and block the flow-out port 45*a* on the exhaust heat collector 50 side. The thermostat valve configuration is merely illustrative and may be modified as appropriate. For example, a thermostat valve with its opening degree becoming larger as the temperature of the engine coolant increases may be provided in the bypass passage 42 to adjust only the amount of the engine coolant flowing through the bypass passage 42 based on the temperature of the engine coolant. Meanwhile, a thermostat valve with its opening degree becoming smaller as the temperature of the engine coolant rises may be provided in the secondary coolant passage 41 where the bypass passage 42 branches off from the secondary coolant passage 41 to adjust the amount of the engine coolant that is supplied to the exhaust heat collector 50 based on the temperature of the engine coolant.

In the above embodiment, the self-contained thermostat valve 45 is illustrated in which the wax sealed therein is liquefied and expands based on the temperature of the engine coolant that flows through the valve element. The thermostat valve configuration is merely illustrative, and other types of valves may also be employed, such as an electrically driven valve that is actuated based on the temperature of the engine coolant.

The above first and second embodiments may be modified suitably as described as follow. The bypass passage 42 and the thermostat valve 45 may be omitted. That is, simply adopting a configuration in which the engine coolant heated by the exhaust heat collector 50 is supplied to the EGR cooler 23 may reduce the difference in temperature between the exhaust gas and the engine coolant in the EGR cooler 23 during cold engine operation and thereby suppress the generation of condensed water in the EGR cooler 23.

The invention claimed is:

1. An internal combustion engine, comprising:
    an exhaust heat collector, in which exhaust gas exchanges heat with engine coolant, that heats the engine coolant;
    an EGR mechanism that recirculates a portion of the exhaust gas to an intake passage through an EGR passage that branches from an exhaust passage;
    an EGR cooler that cools the exhaust gas flowing through the EGR passage through heat exchange with the engine coolant supplied from the exhaust heat collector;
    a bypass passage that bypasses the exhaust heat collector to supply the engine coolant to the EGR cooler;
    a first coolant passage that passes through the internal combustion engine; and a second coolant passage, branched from the first coolant passage, that supplies engine coolant to the EGR cooler through the exhaust heat collector.

2. The internal combustion engine according to claim 1, further comprising:

an amount adjustment device that adjusts an amount of the engine coolant that is supplied to the EGR cooler through the second coolant passage and an amount of the engine coolant to be supplied to the EGR cooler through the bypass passage.

3. The internal combustion engine according to claim 2, wherein the amount adjustment device is a throttle that reduces a cross sectional area of at least one of the second coolant passage and the bypass passage to restrict flow of the engine coolant through at least one of the second coolant passage and the bypass passage.

4. The internal combustion engine according to claim 3, wherein the amount adjustment device increases the cross sectional area of the bypass passage relative to that when the internal combustion engine is started, as a temperature of the exhaust gas increases.

5. The internal combustion engine according to claim 3, wherein the amount adjustment device reduces the cross sectional area of the second coolant passage relative to that when the internal combustion engine is started, as the temperature of the exhaust gas increases.

6. The internal combustion engine according to claim 2, wherein the amount adjustment device is a thermostat valve that opens and closes the bypass passage based on a temperature of the engine coolant; and the thermostat valve blocks the bypass passage and supplies the EGR cooler with the engine coolant heated by the exhaust heat collector if the temperature of the engine coolant is below a predetermined temperature, and opens the bypass passage and supplies the EGR cooler with the engine coolant through the bypass passage if the temperature of the engine coolant is equal to or above the predetermined temperature.

7. An internal combustion engine comprising:

an exhaust heat collector, in which exhaust gas exchanges heat with engine coolant, that heats the engine coolant;

an EGR mechanism recirulates a portion of the exhaust an intake passage through an EGR passage that branches from an exhaust passage;

an EGR cooler that cools the exhaust gas flowing through the EGR passage through heat exchange with the engine coolant supplied from the exhaust heat collector;

bypass passage that bypasses the exhaust heat collector to supply the engine coolant to the EGR cooler; and an amount adjustment device that adjusts an amount of the engine coolant that is supplied to the EGR cooler through a second coolant passage, which supplies engine coolant to the EGR cooler through the exhaust heat collector, and an amount of the engine coolant to be supplied to the EGR cooler through the bypass passage.

* * * * *